Jan. 13, 1953 R. RING 2,625,445
GUIDE FOR BOREHOLE TOOLS
Filed Sept. 23, 1949 2 SHEETS—SHEET 1

INVENTOR.
ROLAND RING
BY
Busser & Harding
ATTORNEYS

Jan. 13, 1953 R. RING 2,625,445
GUIDE FOR BOREHOLE TOOLS
Filed Sept. 23, 1949 2 SHEETS—SHEET 2

INVENTOR.
ROLAND RING
BY
ATTORNEYS.

Patented Jan. 13, 1953

2,625,445

UNITED STATES PATENT OFFICE 2,625,445

GUIDE FOR BOREHOLE TOOLS

Roland Ring, Houston, Tex., assignor to Sperry-Sun Well Surveying Company, Philadelphia, Pa., a corporation of Delaware Application September 23, 1949, Serial No. 117,375

11 Claims. (Cl. 308—4)

This invention relates to a tool guide such as may be used in connection with oil well tools and bore hole survey or well logging instruments and the like.

In bore hole survey and well logging operations it is a well known practice to lower into a bore hole on a wire line or into a drill stem either on a wire line or in go-devil fashion various types of instruments for measuring characteristics of either the bore hole or the strata in the vicinity of the bore hole.

It is necessary that these instruments which are frequently of fragile nature be protected from undue shock or impact as would result from bumping against the walls of the bore hole as they descend into the well. It is also sometimes necessary, particularly when the instruments are positioned in a drill stem, that the instrument be held in a position parallel with the longitudinal axis of the drill stem while performing various measuring operations.

It is an object of this invention to provide a tool guide which when associated with bore hole measuring or well survey instruments will serve to prevent the instrument from receiving undue shock and vibration as the instrument passes downwardly through a bore hole.

Another object of this invention is to provide a tool guide which will maintain an instrument casing in a position parallel with the longitudinal axis of a drill stem.

A further object of this invention is to provide a tool guide which, while supporting an instrument casing, will not unduly restrict the flow of mud or other fluid through a drill stem.

Another object of this invention is to provide a tool guide which will have greater resistance to wear and longer life than the conventional type of tool guide.

These and other objects of the invention will become apparent from the following description when read in conjunction with the accompanying drawings, in which.

Figure 1:
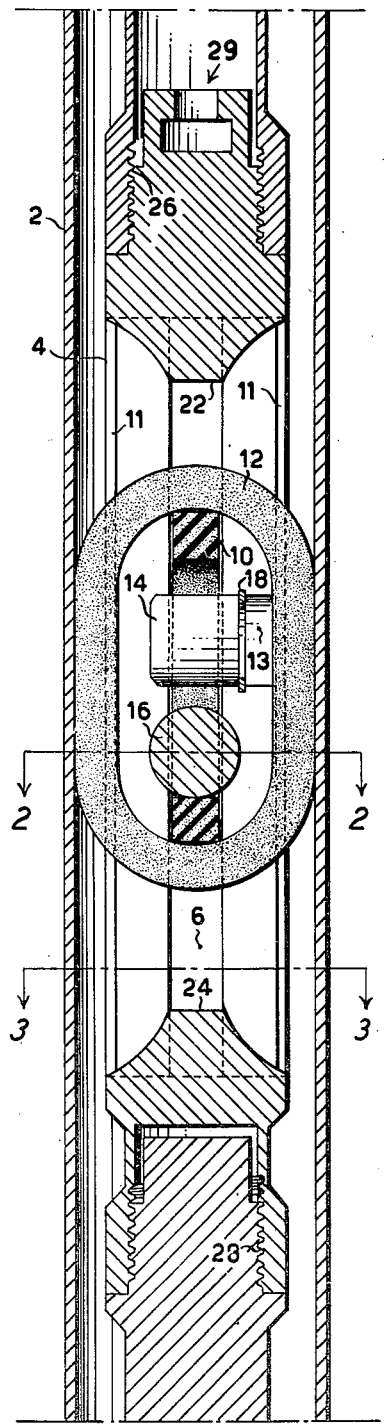
Figure 1 is a longitudinal sectional view of the tool guide in position within a drill stem.
Figure 2:
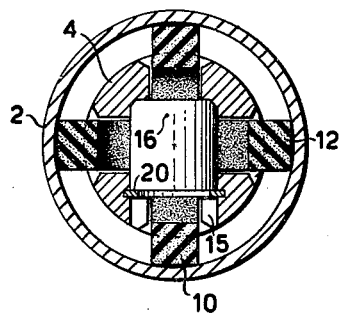
Figure 2 is a transverse sectional view taken on the plane 2—2 of Figure 1.
Figure 3:
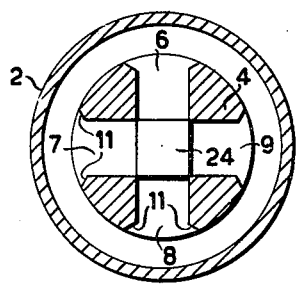
Figure 3 is a transverse sectional view taken on the plane 3—3 in Figure 1.

Referring to Figures 1, 2 and 3, there is shown in a drill stem 2, a guide ring holder 4 which is made of stainless steel or other suitable corrosion-resistant material. Within the guide ring holder there are milled four intersecting radial slots 6, 7, 8 and 9. Within these slots, and at right angles to each other, are mounted the inner guide ring 10 and the outer guide ring 12. The edges of the metal forming the slots are beveled as indicated at 11 in order to prevent the guide rings from being cut by a sharp machined edge. The guide rings, which are formed of a suitable synthetic rubber or other oil, water and wear-resistant flexible material, are normally round or ring shaped and, when the tool guide assembly is inserted within a drill stem, they are deformed by confinement within the drill stem and assume the flattened oval shapes shown in Figure 1.

Inserted into transverse bores 13 and 15 in the guide ring holder are the cylindrical plug members 14 and 16, respectively. The plug members 14 and 16 are retained in position by the snap rings 18 and 20, respectively, received in grooves in the inner walls of the bores 13 and 15.

When the tool guide assembly is inserted into the drill stem the guide rings 10 and 12 are drawn upwardly with respect to the guide ring holder by the friction of their bearing upon the wall of the drill stem. The upward travel of the guide rings within the slots 6, 7, 8 and 9 is arrested by the guide ring 10 bearing against the lower plug member 16 and the guide ring 12 bearing against the guide ring 10. As the tool guide assembly is lowered into the drill stem both the rings are drawn downwardly into the drill stem with the guide ring holder and assume the position shown in Figure 1.

When the tool guide assembly is raised out of the drill stem the guide rings are drawn downwardly within the slots 6, 7, 8 and 9 by the friction of their contact with the drill stem until the guide ring 10 bears against the plug member 14 and the guide ring 12 bears against the guide ring 10. The guide rings are then drawn upwardly out of the drill stem with the guide ring holder.

It should be noted that the longitudinal length of the slots 6, 7, 8 and 9 is sufficient to permit complete freedom of travel for the rings in their elongated form. Thus the rings are always pulled through the drill stem by the guide ring holder by contact with the cylindrical members 14 and 16 and never pushed by contact with the ends 22 and 24 of the slots. Such pushing would be objectionable because the rings would have a tendency to buckle or compress and jam within the drill stem, while pulling always insures a free travel and permits the rings to adapt themselves readily to the inside dimension of the drill stem.

It will be noted that, as shown in Figure 2, ample space exists between the ring members to allow for the passage of drilling mud or other liquids past the guide assembly.

The upper threaded portion 26 and the lower threaded portion 28 of the guide ring holder are adapted to join the guide ring holder with an instrument casing and other portions of the assembly such as a rope socket, wire line attaching means, a sinker bar, a core barrel or the like. A T-slot shown generally at 29 is arranged to receive a bolt to support an instrument in the instrument casing in the usual fashion.

Figure 4:
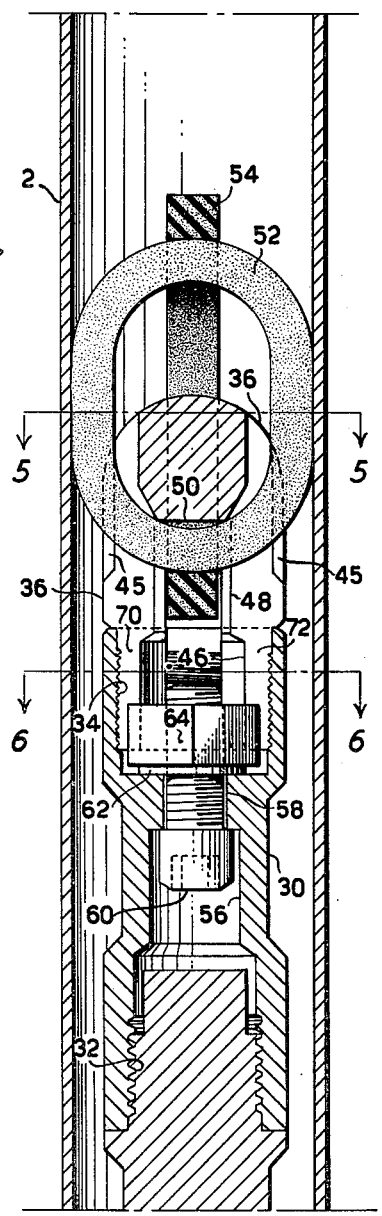
Figure 4 is a longitudinal sectional view of an alternate form of the tool guide in position within a drill stem.
Figure 5:
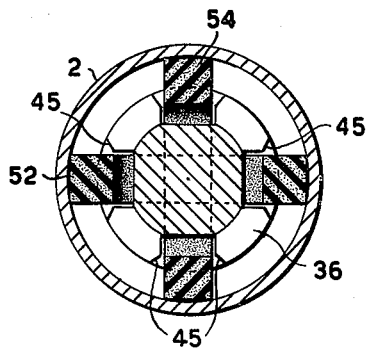
Figure 5 is a transverse sectional view taken on the plane 5—5 of Figure 4.
Figure 6:
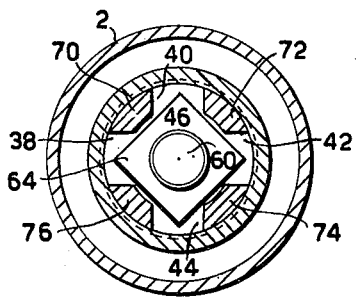
Figure 6 is a transverse sectional view taken on the plane 6—6 of Figure 4.

Figures 4, 5 and 6 show an alternate form of the tool guide adapted for use on the upper end of a go-devil type instrument such as is adapted to be dropped into a drill stem and retrieved therefrom when the drill stem is removed from the bore hole. The lower end of such an instrument may be provided with a guide of the type illustrated in Figure 1. This form of the tool guide includes a member 30 having a lower threaded bore 32 adapted for attachment to an instrument casing, for example, to the top closure plug thereof. The member 30 has an upper threaded bore 34 adapted to receive the threaded lower end of the guide ring holder 36. Into the holder 36 are milled four slots 38, 40, 42 and 44. The center of the holder 36 contains the bores 46 and 48 joining the slots for a part of the length of the slots. The bore 48 is drilled to form a generally flat bottom 50 above which the slots are not joined. Mounted at right angles to each other and passing through the slots are the flexible guide rings 52 and 54. The edges of the metal forming the slots are beveled as indicated at 45 to prevent the ring from being cut by the machined edge of the holder.

The bore 46 and the milled slots 38, 40, 42 and 44 form in the lower portion of the holder 36 the four leg members 70, 72, 74 and 76. These leg members are adapted to be threaded into the tapped bore 34 of the member 30. The member 30 also contains the bores 56 and 58 through which there is inserted the Allen bolt 60 on which is placed the lock washer 62 and the square nut 64.

Prior to the assembly of the holder 36 to the member 30, the guide ring 52 is inserted into the slots 38 and 42 of the holder 36 and the guide ring 54 is inserted into the slots 40 and 44 of the holder 36. The lock washer 62 and the square nut 64 are then placed in position in the member 30. The holder 36 is then assembled to the member 30 by threading the lower leg members of the holder 36 into the threaded upper end of the member 30. After these two members are screwed together the Allen bolt 60 is inserted through the bores 56 and 58 into the nut 64 and the nut 64 is drawn downwardly against, and locked by, the lock washer 62. The nut 64 thus locked in position against the member 30 prevents the leg members 70, 72, 74 and 76 from becoming unscrewed from the member 60 thereby serving to lock the holder 36 in position with the member 30.

The threaded bore 32 in the member 30 is provided to attach the tool guide to the upper end of an instrument casing. When the tool guide is lowered into a drill stem the guide rings 52 and 54 as a result of the friction of their contact with the drill stem will be drawn upwardly relatively to the member 36, and ring 52 will bear generally against the surface 50 and the ring member 54 will bear against the ring member 52. Thus, again, in this form of the tool guide the rings will be pulled, rather than pushed, through the drill stem.

It will be evident that this arrangement of the guide ring will permit sufficient open space to exist between the drill stem and the guide ring holder to allow adequate circulation of drilling mud or other fluid through the drill stem.

If a single rubber ring member such as is employed with the tool guides herein disclosed were forced into a tube having an inside diameter less than the outside diameter of the ring, the ring would assume an elongated form having its major axis lying coincident with the longitudinal axis of the tube and having its minor axis lying diametrically across the tube. Therefore, if two such rings are placed within the tube with one passing through the other and held to lie on planes at 90° to each other they must of necessity lie on planes intersecting each other at the center of the tube. Accordingly, if the guide rings are encased in a holder member such as hereinbefore described, it follows that the holder member will be caused to assume a position centrally within the tube by virtue of the action of the ring members thereon.

It will be noted that the life of the guide rings will be considerably extended due to the fact that if one side of one of the rings encounters a particularly abrasive portion of the drill stem or bore hole that the ring is free to rotate or roll. Thus, the position of the guide rings relative to the tool guide holder may vary and the wear will be distributed generally over the entire outer surface of the rings. Thus, this type of guide will have a much longer life than those guides which are subjected to wear only at the ends of guide leaf or finger members.

It will also be noted that it is possible to replace the guide rings, in the holder of the form as shown in Figure 1 which is inserted within the length of a succession of assembled parts, without disassembling the guide ring holder from the instrument casing. It is only necessary to remove the plug members 14 and 16 and slide new guide rings into position when the old rings have become excessively worn or when it is desired to change the size of the rings to adapt the guide for use in a drill stem of different diameter.

It will be obvious that various modifications may be made in the structure disclosed herein without departing from the scope of the invention as defined in the following claims.

What is claimed is:

1. A guide for centering apparatus within a conduit comprising a retainer of lesser diameter than the inside of said conduit adapted to be joined to said apparatus and flexible guide rings of greater diameter than the inside of said conduit passing transversely through said retainer, portions of said rings engaging the wall of said conduit and being deformed thereby, said rings acting to center said retainer within said conduit and providing space for the passage of fluid between said retainer and said conduit.

2. A guide for centering apparatus passing through a conduit comprising a retainer of lesser diameter than the inside of said conduit adapted to be joined to said apparatus, flexible guide rings of greater diameter than the inside of said conduit passing transversely through said retainer, portions of said rings engaging the wall of said conduit and being deformed thereby, said rings acting to center said retainer within said conduit and providing space for the passage of fluid between said retainer and said conduit, and means in said retainer to position said rings relative to each other and to draw said rings through said conduit with said retainer and said apparatus when said apparatus passes through said conduit.

3. A guide for centering apparatus passing through a conduit comprising a retainer of lesser diameter than the inside of said conduit, said retainer being adapted to be joined to said apparatus and being provided with longitudinally elongated radial slots, flexible guide rings of greater diameter than the inside of said conduit passing transversely through the longitudinally elongated radial slots in said retainer, portions of said rings engaging the wall of said conduit and being deformed thereby, said rings acting to center said retainer within said conduit and providing space for the passage of fluid between said retainer and said conduit, and means in said retainer to draw said rings through said conduit with said retainer and said apparatus when said apparatus passes through said conduit.

4. A guide for centering apparatus passing through a conduit comprising a retainer of lesser diameter than the inside of said conduit, said retainer being adapted to be joined to said apparatus and being provided with longitudinally elongated radial slots, flexible guide rings of greater diameter than the inside of said conduit passing transversely through the longitudinally elongated radial slots in said retainer, portions of said rings engaging the wall of said conduit and being deformed thereby, said rings acting to center said retainer within said conduit and providing space for the passage of fluid between said retainer and said conduit, and means in said retainer to draw said rings through said conduit with said retainer and said apparatus when said apparatus passes through said conduit in either direction.

5. A guide for centering apparatus within a conduit comprising a retainer of lesser diameter than the inside of said conduit adapted to be joined to said apparatus and a pair of flexible guide rings of greater diameter than the inside of said conduit passing transversely through said retainer and each lying in a plane at generally right angles to the other and passing through the longitudinal axis of said retainer, portions of said rings engaging the wall of said conduit and being deformed thereby, said rings acting to center said retainer within said conduit and providing space for the passage of fluid between said retainer and said conduit.

6. A guide for centering apparatus passing through a conduit comprising a retainer of lesser diameter than the inside of said conduit adapted to be joined to said apparatus, a pair of flexible guide rings of greater diameter than the inside of said conduit passing transversely through said retainer and each lying in a plane at generally right angles to the other and passing through the longitudinal axis of said retainer, portions of said rings engaging the wall of said conduit and being deformed thereby, said rings acting to center said retainer within said conduit and providing space for the passage of fluid between said retainer and said conduit, and means in said retainer to position said rings relative to each other and to draw said rings through said conduit with said retainer and said apparatus when said apparatus passes through said conduit.

7. A guide for centering apparatus within a conduit comprising a retainer of lesser diameter than the inside of said conduit adapted to be joined to said apparatus, radial slots extending the length of said retainer and joined by a central bore extending from one end of said retainer for a major portion of the length thereof, and flexible guide rings of greater diameter than the inside of said conduit passing transversely through the slots and the bore in said retainer and encircling the end of said retainer in which the slots are not joined by the bore, said rings engaging the wall of said conduit being deformed thereby and acting to center said retainer within said conduit.

8. A guide for centering apparatus within a conduit comprising a retainer of lesser diameter than the inside of said conduit adapted to be joined to said apparatus, four radial slots disposed generally 90° apart extending the entire length of said retainer and joined by a central bore extending from one end of said retainer for a major portion of the length thereof, and a pair of flexible guide rings of greater diameter than the inside of said conduit passing transversely through the slots and the bore in said retainer perpendicular to each other and encircling the end of said retainer in which the slots are not joined by the bore, said rings engaging the wall of said conduit being deformed thereby and acting to center said retainer within said conduit and providing space for the passage of fluid between said retainer and said conduit.

9. A guide for centering apparatus passing through a conduit comprising a retainer of lesser diameter than the inside of said conduit, said retainer being adapted to be joined to said apparatus and being provided with longitudinally elongated radial slots, a pair of flexible guide rings of greater diameter than the inside of said conduit passing transversely through the longitudinally elongated radial slots in said retainer and each lying in a plane at generally right angles to the other and passing through the longitudinal axis of said retainer, portions of said rings engaging the wall of said conduit and being deformed thereby, said rings acting to center said retainer within said conduit and providing space for the passage of fluid between said retainer and said conduit, and means in said retainer to draw said rings through said conduit with said retainer and said apparatus when said apparatus passes through said conduit.

10. A guide for centering apparatus passing through a conduit comprising a retainer of lesser diameter than the inside of said conduit, said conduit being adapted to be joined to said apparatus and being provided with longitudinally elongated radial slots, a pair of flexible guide rings of greater diameter than the inside of said conduit passing transversely through the longitudinally elongated radial slots in said retainer and each lying in a plane at generally right angles to the other and passing through the longitudinal axis of said retainer, portions of said rings engaging the wall of said conduit and being deformed thereby, said rings acting to center said retainer within said conduit and providing space for the passage of fluid between said retainer and said conduit, and means in said retainer to draw said rings through said conduit with said retainer and said apparatus when said apparatus passes through said conduit in either direction.

11. A guide for centering apparatus passing through a conduit comprising a retainer of lesser diameter than the inside of said conduit adapted to be joined to said apparatus, radial slots extending the entire length of said retainer and joined for the greater portion of their length by a central bore extending from one end of said retainer for a major portion of the length thereof, there being at the other end of said retainer a portion of said retainer extending beyond said bore in which the slots are not joined by the bore, and flexible guide rings of greater diameter than the inside of said conduit passing transversely through the slots and the bore in said retainer and encircling said end portion of said retainer in which the slots are not joined by the bore, said rings engaging the wall of said conduit being deformed thereby and acting to center said retainer within said conduit and providing space for the passage of fluid between said retainer and said conduit, the end portion of said retainer in which the slots are not joined by the bore acting on said rings to draw them through said conduit with said retainer.

ROLAND RING.

REFERENCES CITED

The following references are of record in the file of this patent:

UNITED STATES PATENTS

| Number | Name | Date |
|---|---|---|
| 1,281,756 | Black | Oct. 15, 1918 |
| 1,541,791 | Christofferson | June 16, 1925 |
| 2,145,336 | Boyd | Jan. 31, 1939 |
| 2,153,787 | Anderson | Apr. 11, 1939 |